(12) United States Patent
Fano et al.

(10) Patent No.: US 11,412,305 B2
(45) Date of Patent: Aug. 9, 2022

(54) ENHANCED DIGITAL CONTENT REVIEW

(71) Applicant: Accenture Global Solutions Limited, Dublin (IE)

(72) Inventors: Andrew E. Fano, Lincolnshire, IL (US); Maziyar Baran Pouyan, Emeryville, CA (US); Milind Savagaonkar, Bangalore (IN); Saeideh Shahrokh Esfahani, Mountain View, CA (US); David William Vinson, San Francisco, CA (US); Ritesh Dhananjay Nikose, Nagpur (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/376,598

(22) Filed: Jul. 15, 2021

(65) Prior Publication Data

US 2022/0030309 A1    Jan. 27, 2022

(30) Foreign Application Priority Data

Jul. 24, 2020   (IN) .............................. 202011031721

(51) Int. Cl.
*H04N 21/462* (2011.01)
*G06N 20/00* (2019.01)
*H04N 21/466* (2011.01)
*H04N 21/475* (2011.01)

(52) U.S. Cl.
CPC ......... *H04N 21/4622* (2013.01); *G06N 20/00* (2019.01); *H04N 21/4665* (2013.01); *H04N 21/4756* (2013.01)

(58) Field of Classification Search
CPC .......... H04N 21/4622; H04N 21/4665; H04N 21/4756; G06N 20/00
See application file for complete search history.

(56) References Cited

U.S. PATENT DOCUMENTS

2019/0179956 A1   6/2019  Krasadakis et al.
2021/0118063 A1*  4/2021  Zhao .................... H04N 21/266

OTHER PUBLICATIONS

Cambridge Consultants, "Use of AI in Online Content Moderation: 2019 Report Produced on Behalf of Ofcom," Jul. 18, 2019, 84 pages.
IN Office Action in Indian Appln. No. 202011031721, dated Feb. 24, 2022, 5 pages.

* cited by examiner

*Primary Examiner* — Oschta I Montoya
(74) *Attorney, Agent, or Firm* — Fish & Richardson P.C.

(57) ABSTRACT

Methods, systems, and apparatuses, including computer programs encoded on a computer storage medium, for facilitating analyzing media items and to filter inappropriate media items before distribution to the users. In one aspect, a method includes partitioning digital media items such as videos into segments and/or scenes, and classifying the segments into predetermined classes such as "Violence", "Conversation", "Street", "Nudity", "Animation". After classifications have been assigned, the segments are clustered and/or grouped together before presenting the segments belonging to a particular cluster to a rating entity in a single user interface, for further evaluation. After evaluation, the segments of the media items that were approved by the rating entity are used to identify media items for which all the segments were approved by the rating entity before distributing the media items to the users.

20 Claims, 6 Drawing Sheets

ENHANCED DIGITAL CONTENT REVIEW

CROSS-REFERENCE TO RELATED APPLICATION

This application claims the benefit of India Patent Application No. 202011031721, filed Jul. 24, 2020, which is hereby incorporated by reference in its entirety.

FIELD

The specification generally relates to the automated analysis of digital content.

BACKGROUND

The amount of user generated digital content, including media items like videos, music and movies, is rapidly increasing. For example, users can create and upload video files and/or audio files to media sharing sites. Due to easy access to the internet and the growing popularity of digital content delivery services, more and more digital content is becoming accessible to users.

Some of this content may be subject to content distribution guidelines and/or standards, in order to be shared and/or distributed to users. For example, certain platforms may consider violent or adult content as unsuitable and/or inappropriate based on community standards and prevent distribution of such content. In another example, certain contents may be considered as private information and any distribution of such content is prevented that may lead to breach of privacy. In such circumstances it is necessary to deploy a scalable process for evaluating content and removing content deemed inconsistent with these guidelines and/or standards. For example, digital content can be evaluated and filtered to prevent children from being exposed to content that would be inappropriate to view.

SUMMARY

In general, media sharing sites and/or services can employ rating entities, including human or computer implemented raters, to evaluate digital content before distribution to their users. Content review is an extremely time consuming and expensive process. It is therefore imperative to identify ways to improve evaluation efficiency while maintaining high accuracy.

The methods described in this document provides an efficient means of evaluating digital content by partitioning digital media items such as videos into segments and/or scenes, and classifying the segments into predetermined classes. For example, a content platform can classify the segments into predetermined classes such as "Violence", "Conversation", "Street", "Nudity", "Animation" and "Private". After classifications have been assigned, the segments are clustered together. These clusters contain segments from across multiple media items, not just from within one item. The clusters are then presented to a rating entity in a single user interface, for further evaluation. This type of presentation to the rating entity provides an easy method for approval or refusal of all or a subset of segments by the rating entity. After evaluation of the segments, media items are identified such that for each media item, all the segments corresponding to the media item are approved by the rating entity.

In general, one innovative aspect of the subject matter described in this specification can be embodied in methods including the operations of segmenting into scenes across media items and then clustering rather than clustering at the media item level. The specific benefit is that at the media item level (rather than segment level) far fewer items are likely to be highly similar to each other than at the scene level. Therefore there would be more clusters, that are harder to review (because of length), leading to reduced efficiency.

In general, one innovative aspect of the subject matter described in this specification can be embodied in methods that include the actions of receiving, a plurality of media items wherein the media item is a digital video; generating, a plurality of segments of each media item from among the plurality of media items; classifying, each segment from among the plurality of segments generated from the plurality of media items into one or more predetermined classes; clustering, to generate a cluster of segments for each of two or more predetermined classes; presenting, a cluster of segments to a rating entity for further evaluation; receiving, a response from the rating entity indicating an approval of whether the cluster of segments does not violate content distribution guidelines; identifying, by the response from the rating entity, the media items from among the plurality of media items for which all the segments were approved by the rating entity; and distributing, the media items that were identified indicating that the media items does not violate the content distribution guidelines.

Other embodiments of this aspect include corresponding methods, apparatus, and computer programs, configured to perform the actions of the methods, encoded on computer storage devices. These and other embodiments can each optionally include one or more of the following features.

Methods can further include presenting, a cluster of segments to two or more rating entities for further evaluation; receiving, a response from each of the two or more rating entities indicating two or more approval of whether the cluster of segments does not violate content distribution guidelines; generating, a final approval by combining the responses from each of the two or more rating entities.

Methods may include classifying each segment from among the plurality of segments into two or more predetermined classes includes using a machine learning algorithm to classify the segments into two or more pre-determined classes.

Methods may include receiving a response from the rating entity further include an approval of a subset of segments from the multiple segments in a cluster that indicates that the subset of segments does not violate content distribution policies wherein a rating entity can be a live rating entity or a computer implemented technique capable of evaluating segments generated from media items.

Methods may further include a cluster of segments that is presented to a rating entity that includes one or more segments that have already been rated by another rating entity.

Methods may also include one or more segments of a particular media item that are not rated when an initial segment of the particular media item is determined to violate the content distribution guidelines.

Particular embodiments of the subject matter described in this specification can be implemented to realize one or more of the following advantages. For example, the techniques discussed throughout this document can evaluate media items to detect inappropriate content within the media item, which prevents distribution of the media items with inappropriate content to end users.

Existing techniques that are implemented to detect and filter inappropriate content, evaluate media items as a whole (i.e. the entire duration of the media item such as a video).

In contrast, the techniques discussed throughout this document evaluate batches of media segments that are generated from the media items such that the entire process of evaluation consumes less time. Specifically, the enhanced techniques described herein can evaluate the most sensitive content in a prioritized manner, so that evaluations can be made more quickly while minimizing the time devoted to evaluating non-sensitive portions.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims

DETAILED DESCRIPTION

This document discloses methods, systems, apparatus, and computer readable media that are used to facilitate analyzing media items and to filter inappropriate media items before distribution to the users. Examples of inappropriate media items may further include media items that show violence, nudity, xenophobia, discrimination and private and/or personal information. In some implementations, an evaluation process is used to reduce the risk that inappropriate content will be distributed to users, while also reducing the amount of time and computational resources that are required to evaluate the content.

Briefly, the enhanced techniques described herein segment individual media items that are to be evaluated into pools of similar scene types. The segment pools are labeled with scene types such as "street," "violence," "indoor conversation," etc. Summary representations, for example thumbnails, of similarly-labeled scenes from different items of content are presented at once using a single user interface for evaluation by a rater as a batch. If a batch of scenes is confirmed by a rater through the interface as inappropriate, all of the media items associated with these scenes are removed without having to review the as yet unreviewed remaining scenes from this video. That is, if one part of a video has been found inappropriate, no need to review the rest of it.

As used throughout this document, the phrases "content" and "media" refer to a discrete unit of digital content or digital information (e.g., a video clip, audio clip, multimedia clip, texts, etc). Content can be electronically stored in a physical memory device as a single file or in a collection of files, and content can take the form of video files, audio files, multimedia files, image files, or text files and include advertising information. Content can be provided for distribution by various entities, and a content distribution system can distribute content to various sites and/or native applications for many different content generators.

Figure 1:
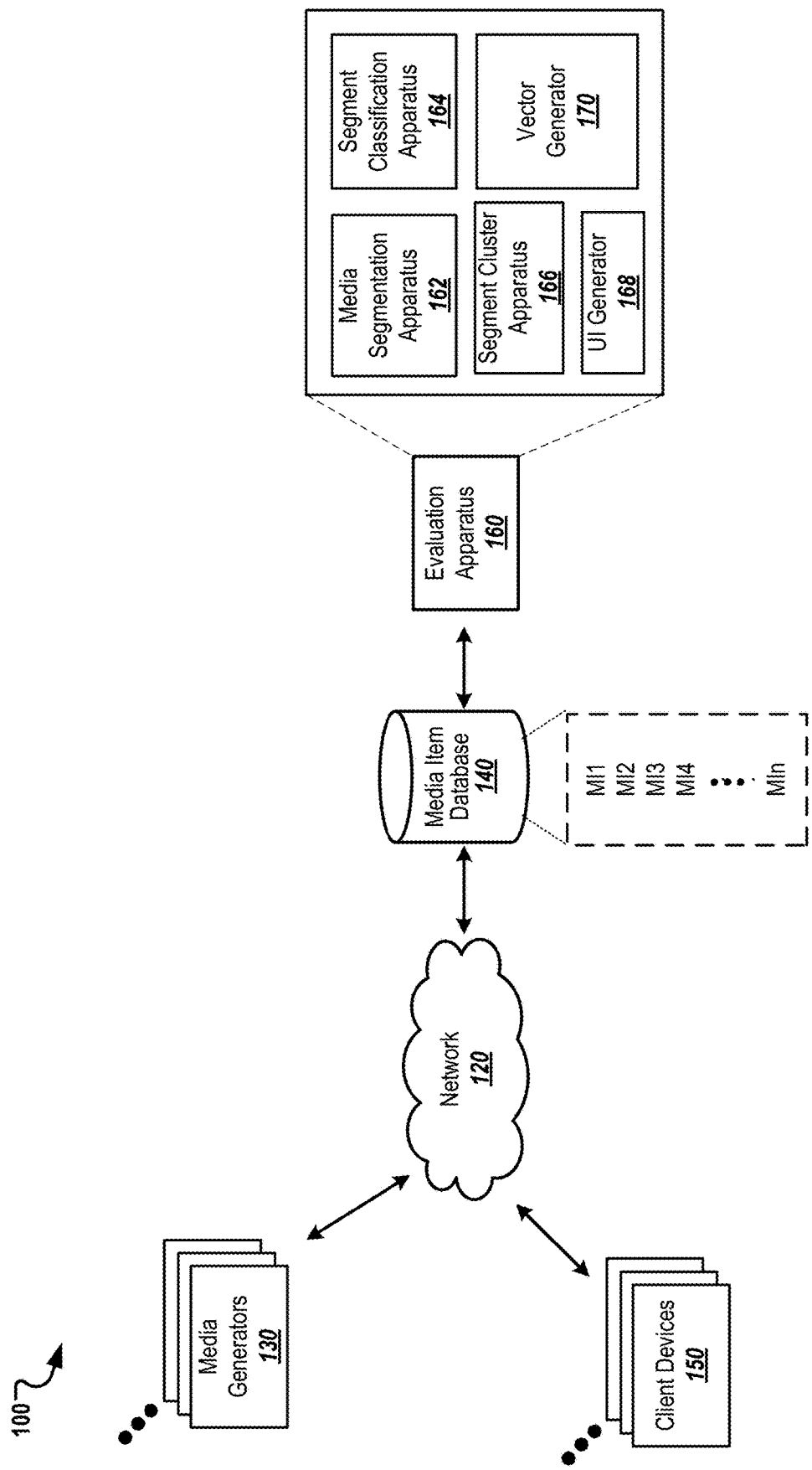
FIG. 1 is a diagram illustrating an example of a system in which media items are evaluated.

FIG. 1 is a block diagram of an example system 100 in which the media items are evaluated. The example environment comprises a network 120. The network 120 can include a local area network (LAN), a wide area network (WAN), the Internet or a combination thereof. The network 120 can also comprise any type of wired and/or wireless network, satellite networks, cable networks, Wi-Fi networks, mobile communications networks (e.g., 3G, 4G, and so forth) or any combination thereof. The network 120 can utilize communications protocols, including packet-based and/or datagram-based protocols such as internet protocol (IP), transmission control protocol (TCP), user datagram protocol (UDP), or other types of protocols. The network 120 can further include a number of devices that facilitate network communications and/or form a hardware basis for the networks, such as switches, routers, gateways, access points, firewalls, base stations, repeaters or a combination thereof. The network 120 connects media generators 130, media item database 140, client device 150.

The example environment 100 further includes media generators 130 that generate media items that are uploaded to the media item database 140. The media generators 130 can include professional organizations (or companies) that generate media for distribution to users as part of a business venture, and can also include individuals that upload content to share with other users. For example, individuals can upload video or audio files to a media sharing site (or application) to share that media with other users around the globe. Similarly, individuals can upload video or audio files to a social network site (e.g., by posting the video or audio to their account or stream), to be viewed by their friends, specified social network users, or all users of the social network. The generators can also be machines or systems. For example, machine generated "deep fakes" would be included.

A client device 150 is an electronic device that is capable of requesting and receiving resources over the network 120. Example client devices 150 include personal computers, mobile communication devices, and other devices that can send and receive data over the network 120. A client device 150 typically includes a user application, such as a web browser, to facilitate the sending and receiving of data over the network 120, but native applications executed by the client device 150 can also facilitate the sending and receiving of data over the network 120.

The ability of individuals and/or media generators 130 to upload media at essentially any time of the day, any day of the week, and the sheer volume of media uploads by individuals' for distribution to users on their client devices 150 stages the issue of enforcing content guidelines related to filtering of inappropriate content before the media items are available for distribution to the client devices 150. To enforce filtering of inappropriate content, the environment 100 further comprises an evaluation apparatus 160. In some implementations, the evaluation apparatus 160 processes media items stored in the media item database 140.

In some implementations, the evaluation apparatus 160 is implemented in a distributed computing environment that includes, for example, a server and a set of multiple computing devices that are interconnected and can execute operations (collectively and/or individually) determined by the methods presented in this document to filter out media items that includes inappropriate content.

As discussed in more details below, the evaluation apparatus 160 implements a media evaluation technique that uses a combination of machine implemented methods and live rating entities. The machine implemented methods uses media segmentation techniques and/or machine learning techniques to partition the media items into segments, e.g., cuts or scenes. In general, a media item such as a video may be composed of individual video frames that may be grouped into a number of segments. A segment may be characterized as a collection of video frames that may be related in action, place, context, and/or time, with such relationship perhaps corresponding to the context of the content. Similarly, a text document can be segmented into sections, paragraphs, etc.

Each of the segments are further classified into predetermined classes such as "Violence," "Conversation," "Street," "Nudity," or "Animation". Other examples of such predetermined classes can include "Privacy" that may include segments that may include or refer to private information such as name, location or description of an entity (for example, a person, an organization etc.). In some implementations, the predetermined classes are selected by the designer of the system prior to evaluating media items. In other implementations, the designer of the system can add new classes to the system at any given point of time after the system is online and is in use for media item evaluation.

After classification of the segments from multiple media items into predetermined classes, the segments are provided to a machine-implemented rater or a live rater such that the rater is able to view all segments from multiple media items that belong to the same class. In some implementations, each segment that is provided to the rating entity, is represented using a portion of the respective segment. For example, a video segment can be represented using a thumbnail that is generated from among the multiple video frames in the video segment. In some implementations, the rating entity after analyzing the segments for inappropriate content can approve all or a subset of segments as being appropriate.

In some implementations, the rating entity can further evaluate one or more individual segments from among the multiple segments for inappropriate content. For example, assume that the rating entity is provided with twenty thumbnails such that each of the twenty thumbnails represent a respective segment that was classified into one of the predetermined classes such as 'conversation'. In such an example, the rating entity can select one or more segments from among the twenty segments for further evaluation before approving the segments. In some implementations, further evaluation of the selected segments can be performed by partitioning each of the selected segments into sub-segments and evaluating the sub-segments for inappropriate content.

In some implementations, more than one live rating entity can be used for evaluating the same segments from the multiple media items. In such implementations, the final determination of whether a particular segment is appropriate is performed by aggregating the evaluations performed by each individual rating entity for the particular segment. In some implementations, the evaluation performed by a particular rating entity from among multiple rating entities is given more priority based on the past evaluations performed by the particular rating entity or in some case it may be based on the expertise of the particular rating entity.

In some implementations, the rating entities can be a computer implemented methods (rule and/or machine learning based methods) that evaluates each segment from among the multiple segments for inappropriate content. For example, in some implementations, the skin-detection algorithms, violence detection algorithms or other NLP methods can be used to identify inappropriate content in the segments.

In some implementations, after evaluation and approval of the segments by the rating entities, a subset of the media items are identified for distribution such that all segments of each media item in the subset of media items have been approved by the rating entities. For example, assume that a particular media item such a video includes three segments such that the first and the third segment belongs to the class 'Conversation' and the second segment belongs to the class 'Street'. Also assume that the rating entity approved all segments from the class 'Conversation' and 'Street'. In this example, the video that was segmented in the earlier step is identified as allowable for distribution since all three segments of the video was approved by the rating entity.

In another example, assume that the video includes three segments such that the first and the third segment belongs to the class 'Conversation' and the second segment belongs to the class 'Violence'. Also assume that after presenting the classes of the segments to the rating entity, the rating entity approves the segments in the class 'Conversation' as appropriate but does not approve the class 'Violence'. In such a case, the video is not identified as allowable for distribution since the second segment of the video belonged to the class 'violence' that was not approved by the rating entity and distribution of the video to the end users is not allowed.

In some implementations, the evaluation apparatus can implement a media segmentation apparatus 162, a segment classification apparatus 164, a segment cluster apparatus 166, a user interface (UI) generator 168 and a vector generator 170. Each of the components described above is further explained in detail with reference to FIG. 2-4.

Figure 2:
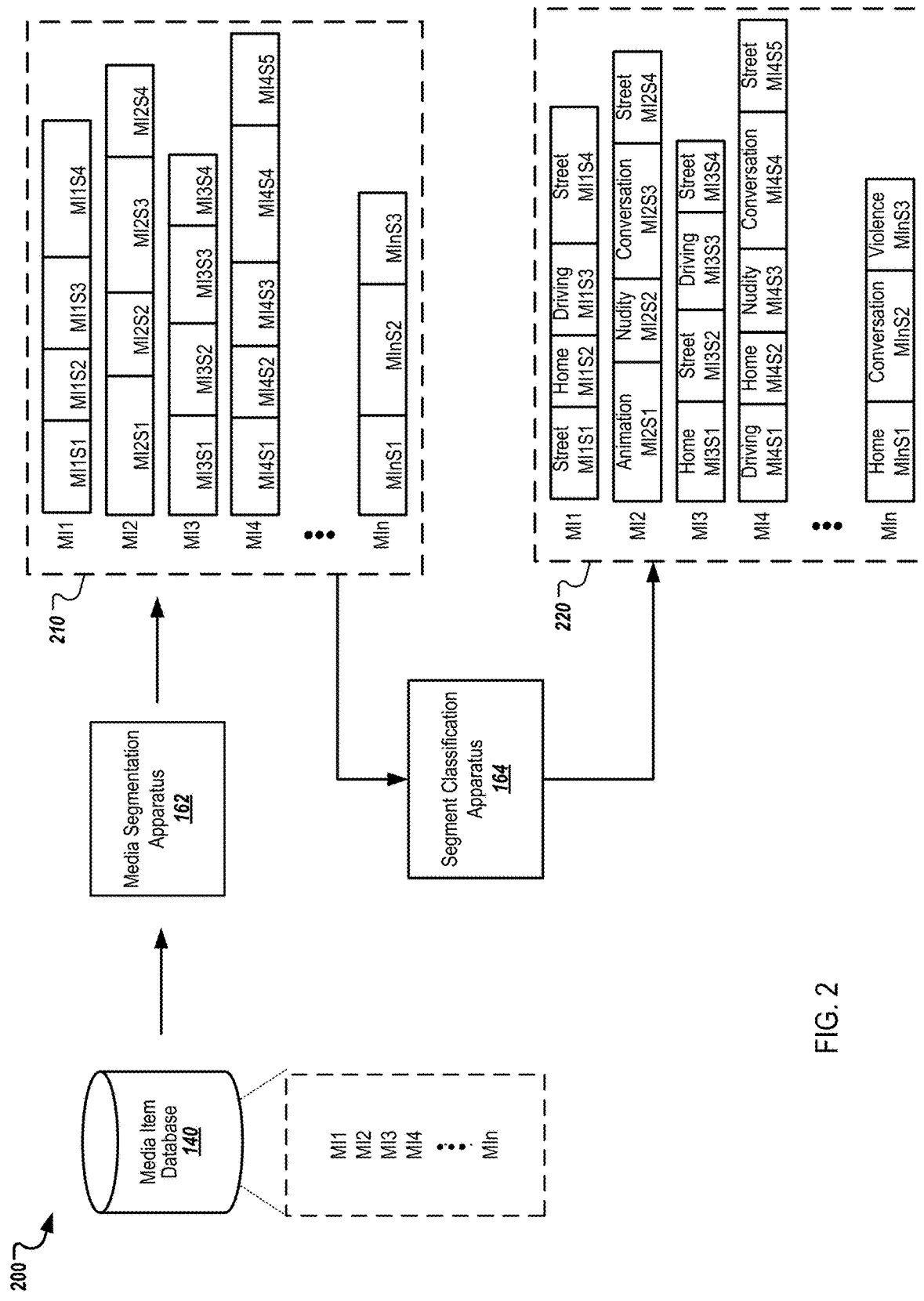
FIG. 2 is a diagram illustrating an example implementation of the media segmentation apparatus and the media classifier apparatus.

FIG. 2 is a block diagram illustrating an example implementation of the media segmentation apparatus 162 and the segment classification apparatus 164 within the evaluation apparatus 160. In some implementations, the media segmentation apparatus 162 that is implemented within the evaluation apparatus 160 receives multiple media items from the media item database 140. For example the media item database 140 includes n media items (MI1-MIn) and the media segmentation apparatus 162 receives as input the media items (MI1-MIn) from the media item database 140. In some implementations, the media segmentation apparatus 162 processes each media items from among the multiple media items to partition the media items into multiple segments. As mentioned before, a media item such as a video may be composed of individual video frames that may be grouped into a number of segments. A segment may be characterized as a collection of video frames that may be related in action, place, context, and/or time, with such relationship perhaps corresponding to the context of the content.

For example, the media segmentation apparatus 162 processes each media item (MI1-MIn) and partitions each of the media items (MI1-MIn) to generate the corresponding segments represented by the output 210. For example, the media item MI1 has four segments MI1S1-MI1S4. Similarly, media items MI2-MIn are partitioned into the corresponding segments as shown in 210.

In some implementations, the media segmentation apparatus 162 can implement a machine learning model to process media items to partition the media item into segments. A machine learning model can be any technique deemed suitable for the specific implementation, such as SVM, clustering or any artificial neural network includes convolutional neural network to name a few.

In some implementations, training the machine learning model involves tuning the trainable parameters of the machine learning model such that the machine learning model can analyze properties and/or features of a media item such as video frames of a video to generate sets of sequential video frames (segments and/or scenes) that are related in action, place, context, and/or time, with such relationship perhaps corresponding to the context of the media item. Depending on the specific implementation, the training process of the machine learning model can be supervised, unsupervised, or semi-supervised.

In some implementations, the media segmentation apparatus 162 implements an algorithmic and/or heuristic approach to partition the media items into segments. For example, in some implementations, the media segmentation apparatus 162 can utilize pixel-wise comparisons, color histograms, structural features of the frames such as edges, or abrupt transitions to partition media items by analyzing the video frames in the media item.

In some implementations, after partioning the media items into the corresponding segments, each segment is classified into predetermined classes using the segment classification apparatus 164. For example, the segment classification apparatus 164 processes each segment in 210 of the media items MI1-MIn generated by the media segmentation apparatus 162 into predetermined classes "Violence," "Conversation," "Street," "Driving," "Home," "Nudity" and "Animation" as shown in 220. For example, the four segments (MI1S1-MI1S4) of the media item MI1 are classified into four classes "Street," "Home," "Driving" and "Street" respectively. Similarly each segment in 210 of each media item MI2-MIn is processed by the segment classification apparatus 164 and classified into one of the predetermined classes as seen in 220.

In some implementations, the segment classification apparatus 164 can classify the segments into one or more classes other than the predetermined classes. In such implementations, the classification is based on the similarity and/or context of one or more segments that according to the segment classification apparatus 164 do not fall under any of the predetermined classes. For example, assume that the segment classification apparatus 164 generates a likelihood for a segment and each of the predetermined classes. The designer of the system may implement a threshold based system that ensures a certain confidence in the classification result. For example, the designer may implement a threshold of 0.7 such that a segment is classified into the predetermined class that has a likelihood equal to or more than the threshold. In such implementations, if none of the likelihood associated with the segment and each of the predetermined classes is more than the threshold, the segment can be classified into an unknown class. In some implementations, the unknown class can be treated as a new class for the other methods and techniques described in this specification.

Figure 3:
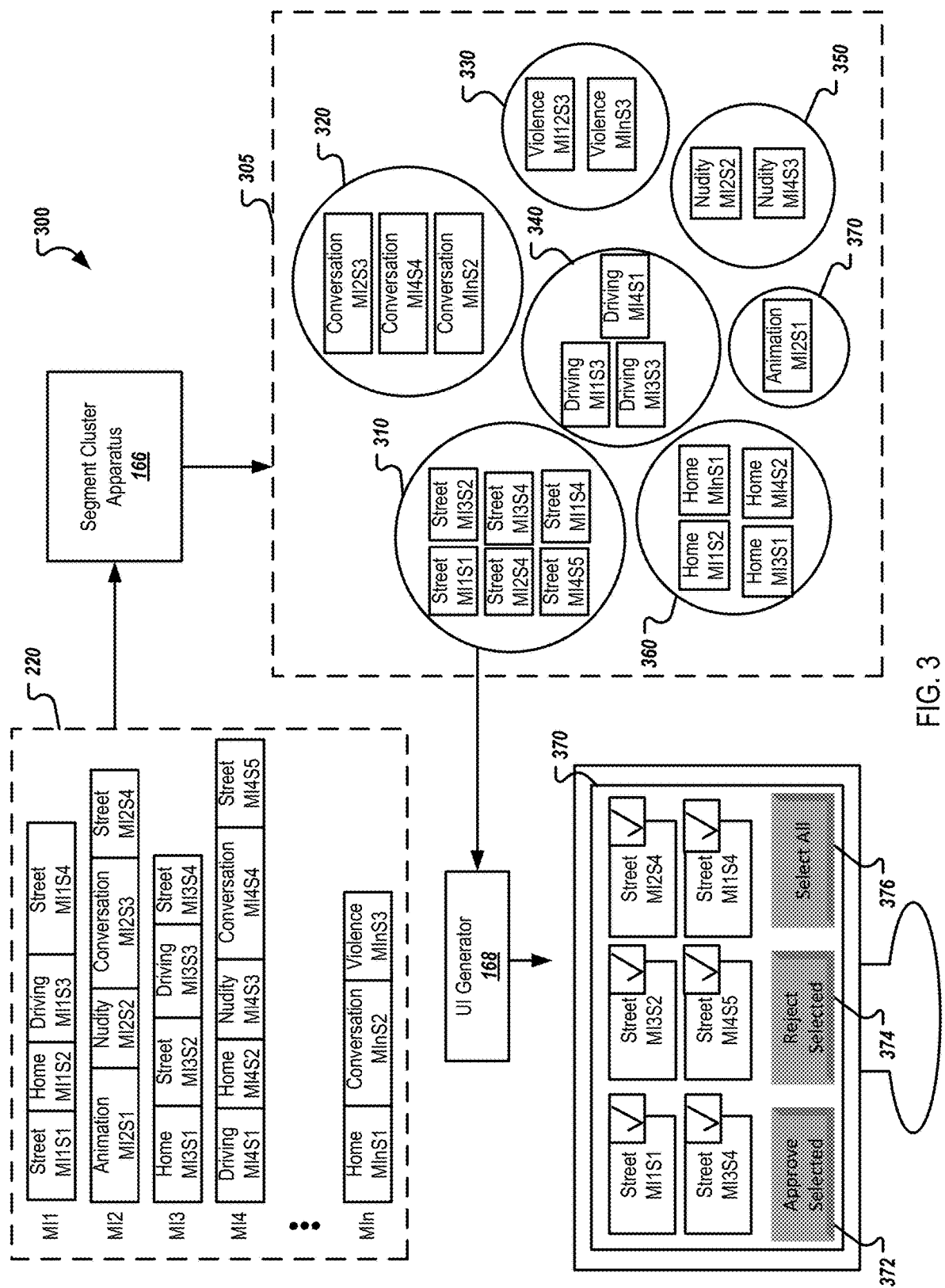
FIG. 3 is a diagram illustrating an example implementation of the segment cluster apparatus and the UI generator.

FIG. 3 is a block diagram illustrating an example implementation of the segment cluster apparatus 166 and the UI generator 168 implemented within the evaluation apparatus 160. In some implementations, the segment cluster apparatus 166 receives as input all classified segments corresponding to all the media items and generates multiple groups of the predetermined classes such that each group of a particular predetermining class includes only those segments that were classified into the particular predetermined class. For example, the classified segments (MI1S1-MI1S4) of the media items MI1 in 220 is provided as input to the segment cluster apparatus 166. The segment cluster apparatus 166 groups the segment MI1S1 that was classified as belonging to class "Street" by the segment classification apparatus 164 into a cluster 310. The cluster 310 includes all segments from all media items that were classified as belonging to class "Street" by the segment classification apparatus 164. As for another example, the segment MI1S2 that was classified as "Home" by the segment classification apparatus 164 is grouped into a cluster 360.

Continuing with the above example 305 represents the multiple clusters of segments generated by the segment cluster apparatus 166. For example, cluster 340 includes all segments that were classified as "Driving", cluster 320 includes all segments that were classified as "Conversation", cluster 330 includes all segments that were classified as "Violence" cluster 350 includes all segments that were classified as "Nudity," and cluster 370 includes all segments that were classified as "Animation".

In some implementations, the evaluation apparatus 160 implements a UI generator 168 that generates a user interface that presents the segments of each individual cluster to a rating entity. For example, the UI generator 168 takes as input the segments from the cluster 310 that includes all segments that were classified as "Street" and generates a user interface 370. In some implementations, each segment that is presented to the rating entity using the user interface 370, is represented using a portion of the respective segment. For example, a particular segment is represented using a thumbnail that is generated from among the multiple video frames in the particular segment.

In some implementations, the user interface 370 also includes clickable and/or selectable controls that the rating entity can interact with. For example, the user interface 370 includes three clickable buttons 372, 374 and 376. In some implementations, the rating entity can select all segments using the clickable button 376 and approve all selected segments that are currently presented to the rating entity by clicking the button 372. In other implementation, the rating entity can select a subset of segments from the multiple segments by selecting individual segments (by clicking and/or selecting) and approve the selected segments by clicking the button 372.

Figure 4:
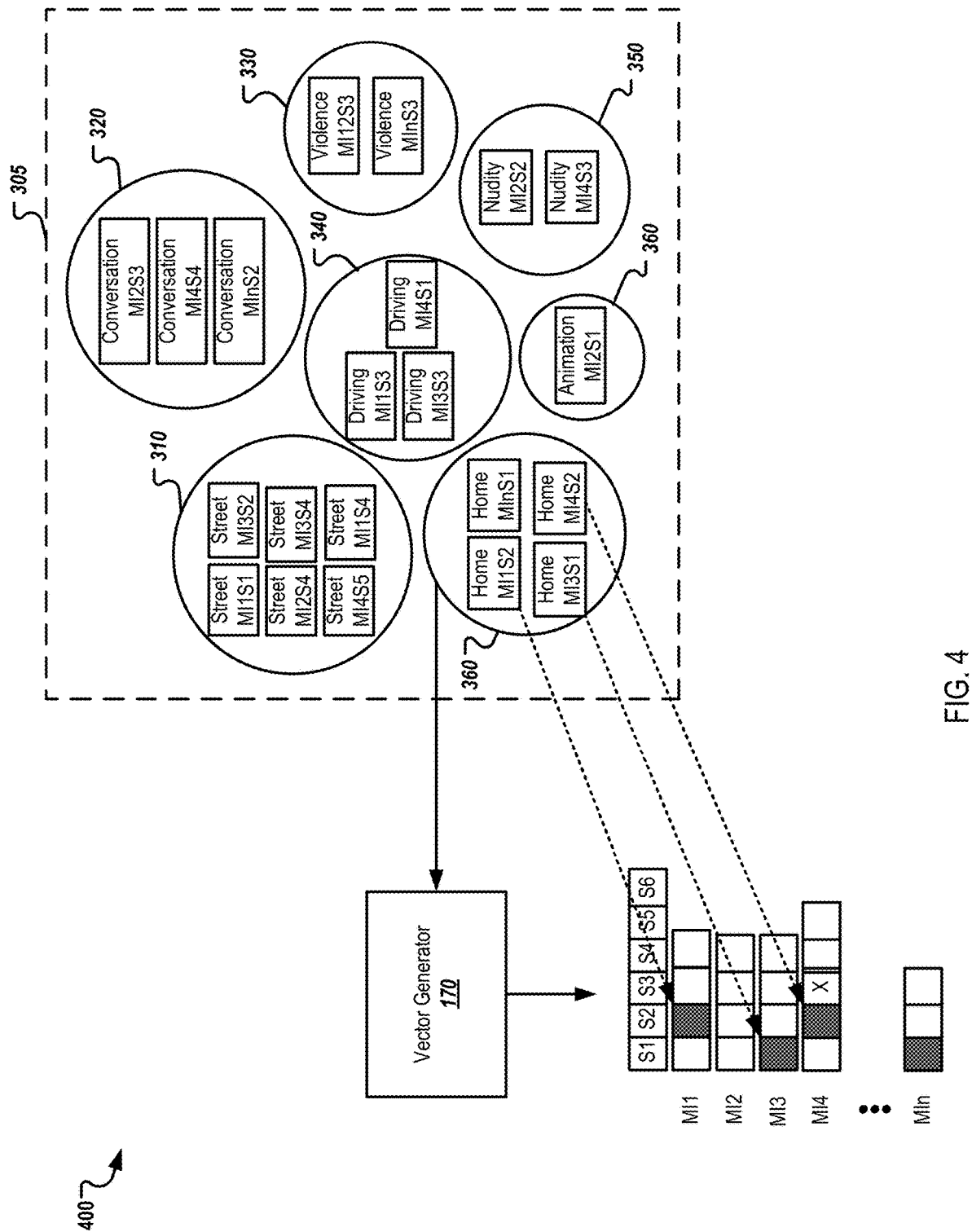
FIG. 4 is diagram illustrating an example implementation of the vector generator.

FIG. 4 is a block diagram illustrating an example implementation of the vector generator 170 implemented within the evaluation apparatus 160. In some implementations, vector generator 170 identifies media items from among the multiple media items such that all segments of each of the media item are approved by the rating entity. For example, assume that the rating entity approves all segments in the clusters 310, 340 and 360. The vector generator 170 uses the segments in the clusters 310, 340 and 360 to identify media items for which all the segments have been approved. For example, the segments of the media item MI1 that includes MI1S1 in cluster 310, MI1S2 in cluster 360, MI1S3 in cluster 340 and MI1S4 in cluster 310 are approved. Since all the segments of the media item MI1 are approved, the vector generator 170 identifies the media item MI1 as being approved by the rating entity for distribution to the users.

In another example, assume that the rating entity approves all segments in the clusters 310, 320, 370 and rejects all segments in the cluster 350 since cluster 350 includes all segments that were classified as belonging to the class "Nudity". In such a scenario, all segments of the media item MI2 are not approved by the rating entity since three segments (MI2S1, MI2S3 and MI2S4) are approved by the rating entity but the segment MI2S2 was not approved. In such a scenario, the vector generator 170 does not identify MI2 are completely approved and hence the media item MI2 is filtered and not allowed for distribution.

In some implementations, after identifying the media items that are approved for distribution, the media items are distributed over the network 120 to the client devices 150 for presentation to the end user. For example, since all the segments of the media item MI1 are approved, the vector generator 170 identifies the media item MI1 and the media item MI1 is allowed for distribution to end users on the client devices 150.

Figure 5:
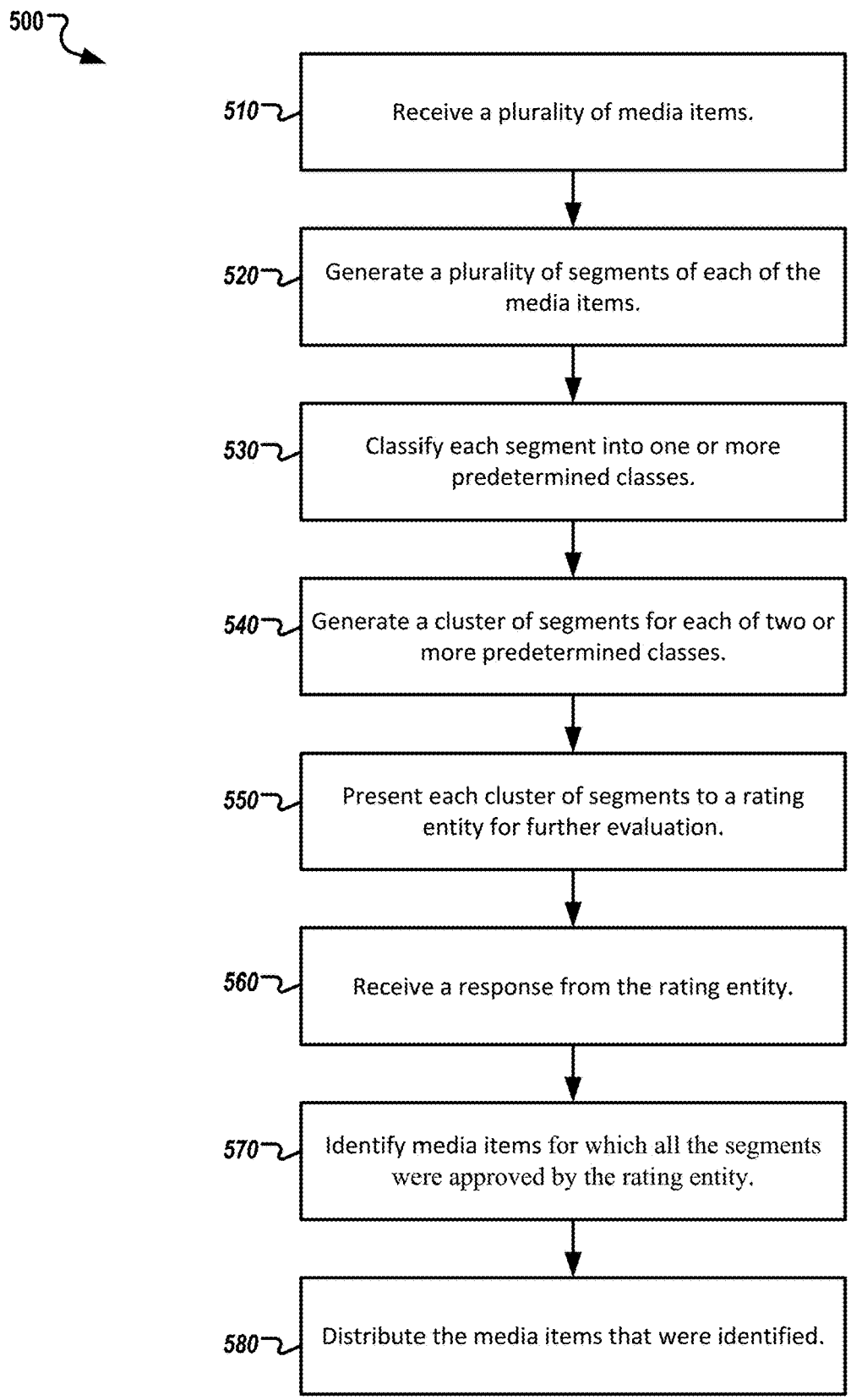
FIG. 5 is a flow chart of an example media item evaluation process.

FIG. 5 is the flow diagram of an example process 500 for evaluating media items and filtering inappropriate content from distribution to the end users. Operations of process 500 are described below as being performed by the components of the system described and depicted in FIGS. 1-4. Operations of the process 500 are described below for illustration purposes only. Operations of the process 500 can be performed by any appropriate device or system, e.g., any appropriate data processing apparatus. Operations of the process 500 can also be implemented as instructions stored on a non-transitory computer readable medium. Execution of the instructions cause one or more data processing apparatus to perform operations of the process 500.

The evaluation apparatus 160 receives a plurality of media items (510). In some implementations, and as described with reference to FIGS. 1 and 2, the evaluation apparatus 160 receives as input, the media items stored in the media item database 140 and processes the media items to detect and filter media items that include inappropriate content before distribution to end users. For example, the media item database 140 stores multiple media items MI1-MIn that were uploaded by individuals and/or media generators to media sharing sites for distribution. Before distribution of the media items to the end users, the evaluation apparatus 160 processes the media items MI1-MIn using the media segmentation apparatus 162, the segment classification apparatus 164, the segment cluster apparatus 166, the user interface (UI) generator 168 and the vector generator 170 that are implemented within the evaluation apparatus 160.

Each media item from among the multiple media items is partitioned to generate a plurality of segments (520). In some implementations, the media segmentation apparatus 162 implemented within the evaluation apparatus 160 processes each media items from among the multiple media items to partition the media items into multiple segments. For example, the media segmentation apparatus 162 processes each media item (MI1-MIn) and partitions each of the media items (MI1-MIn) to generate the corresponding segments represented by the output 210. For example, the media item MI1 has four segments MI1S1-MI1S4. Similarly, media items MI2-MIn are partitioned into the corresponding segments as shown in 210.

In some implementations, the media segmentation apparatus 162 can implement a machine learning model to process media items to partition the media item into segments. A machine learning model can be any technique deemed suitable for the specific implementation, such as SVM, clustering or artificial neural network that includes convolution neural network layers, fully connected layers etc.

In some implementations, the media segmentation apparatus 162 implements an algorithmic and/or heuristic approach to partition the media items into segments. For example, in some implementations, the media segmentation apparatus 162 can utilize pixel-wise comparisons, color histograms, structural features of the frames such as edges, or abrupt transitions to partition media items by analyzing the video frames in the media item.

Each segment from the multiple media items is classified into one or more predetermined categories (530). In some implementations, after partioning the media items into the corresponding segments, each segment is classified into predetermined classes using the segment classification apparatus 164 that is implemented within the evaluation apparatus 160. For example, the segment classification apparatus 164 processes each segment in 210 of the media items MI1-MIn generated by the media segmentation apparatus 162 into predetermined classes "Violence," "Conversation," "Street," "Driving," "Home," "Nudity" and "Animation" as shown in 220. For example, the four segments (MI1S1-MI1S4) of the media item MI1 are classified into four classes "Street", "Home", "Driving" and "Street" respectively. Similarly each segment in 210 of each media item MI2-MIn is processed by the segment classification apparatus 164 and classified into one of the predetermined classes as seen in 220.

In some implementations, the predetermined classes are selected by the designer of the system prior to evaluating media items. In other implementations, the designer of the system can add new classes to the system at any given point of time after the system is online and is in use for media item evaluation.

Each segment is grouped together to generate two or more clusters (540). In some implementations, the segment cluster apparatus 166 implemented within the evaluation apparatus 160 receives as input all classified segments corresponding to all the media items and generates multiple groups of the predetermined classes such that each group of a particular predetermining class includes only those segments that were classified into the particular predetermined class. For example, the classified segments (MI1S1-MI1S4) of the media items MI1 in 220 is provided as input to the segment cluster apparatus 166. The segment cluster apparatus 166 groups the segment MI1S1 that was classified as belonging to class "Street" by the segment classification apparatus 164 into a cluster 310. The cluster 310 includes all segments from all media items that were classified as belonging to class "Street" by the segment classification apparatus 164. As for another example, the segment MI1S2 that was classified as "Home" by the segment classification apparatus 164 is grouped into a cluster 360.

Segments from each cluster from among the two or more clusters are presented to the rating entities for evaluation (550). In some implementations, the evaluation apparatus 160 implements a UI generator 168 that generates a user interface that presents the segments of each individual cluster to a rating entity. For example, the UI generator 168 takes as input the segments from the cluster 310 that includes all segments that were classified as "Street" and generates a user interface 370. In some implementations, each segment that is presented to the rating entity using the user interface 370, is represented using a portion of the respective segment. For example, a particular segment is represented using a thumbnail that is generated from among the multiple video frames in the particular segment.

A response is received from the rating entity indicating an approval of whether the cluster of segments does not violate content distribution guidelines (560). In some implementations, the rating entity can select all segments using the clickable button 376 and approve all selected segments that are currently presented to the rating entity by clicking the button 372. In other implementation, the rating entity can select a subset of segments from the multiple segments by selecting individual segments (by clicking and/or selecting) and approve the selected segments by clicking the button 372. Based on the evaluation performed by the rating entity, the system receives all segments that were approved by the rating entity signaling that those segments do not violet content distribution guidelines.

Media items are identified for which all the segments were approved by the rating entity (570). In some implementations, vector generator 170 identifies media items from among the multiple media items such that all segments of each of the media item are approved by the rating entity. For example, assume that the rating entity approves all segments in the clusters 310, 340 and 360. The vector generator 170 uses the segments in the clusters 310, 340 and 360 to identify media items for which all the segments have been approved. For example, the segments of the media item MI1 that includes MI1S1 in cluster 310, MI1S2 in cluster 360, MI1S3 in cluster 340 and MI1S4 in cluster 310 are approved. Since all the segments of the media item MI1 are approved, the vector generator 170 identifies the media item MI1 as being approved by the rating entity for distribution to the users.

In another example, assume that the rating entity approves all segments in the clusters 310, 320, 370 and rejects all segments in the cluster 350 since cluster 350 includes all segments that were classified as belonging to the class "Nudity". In such a scenario, all segments of the media item MI2 are not approved by the rating entity since three segments (MI2S1, MI2S3 and MI2S4) are approved by the rating entity but the segment MI2S2 was not approved. In such a scenario, the vector generator 170 does not identify MI2 are completely approved and hence the media item MI2 is filtered and not allowed for distribution.

Media items are distributed that were identified indicating that the media items do not violate the content distribution guidelines (580). In some implementations, after identifying the media items, the identified media items are distributed over the network 120 to the client devices 150 for presentation to the end user. For example, since all the segments of the media item MI1 are approved, the vector generator 170 identifies the media item MI1 and is allowed for distribution to end users on the client devices 150.

Figure 6:
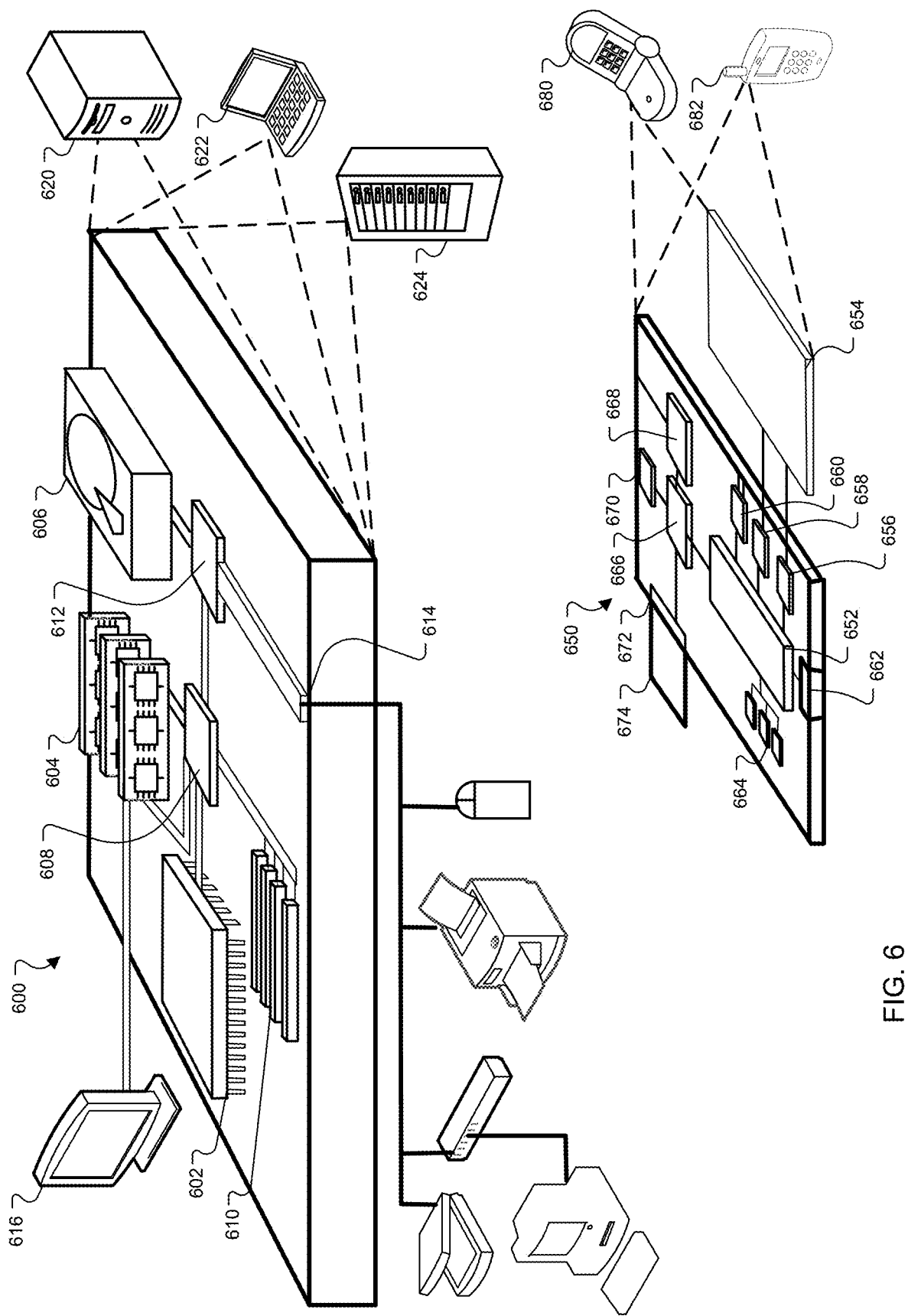
FIG. 6 is a block diagram of computing devices.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of client devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface controller 408 connecting to memory 604 and high-speed expansion ports 610, and a low speed interface controller 612 connecting to a low-speed expansion port 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 400. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

Additionally, computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

The high-speed interface controller 408 manages bandwidth-intensive operations for the computing device 600, while the low-speed interface controller 612 manages lower bandwidth-intensive operations. Such allocation of functions is exemplary only. In one implementation, the high-speed controller 408 is coupled to memory 604, display 616 (e.g., through a graphics processor or accelerator), and to high-speed expansion ports 610, which may accept various expansion cards (not shown). In the implementation, low-speed controller 412 is coupled to storage device 606 and low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a client device (not shown), such as device 650. Each of such devices may contain one or more of computing devices 600, 650, and an entire system may be made up of multiple computing devices 600, 650 communicating with each other.

Computing device 650 includes a processor 652, memory 664, an input/output device such as a display 654, a communication interface 666, and a transceiver 468, among other components. The device 450 may also be provided with a storage device, such as a microdrive, solid state storage component, or other device, to provide additional storage. Each of the components 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 602 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 464 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In-line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 450, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar client device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, various forms of the flows shown above may be used, with steps re-ordered, added, or removed. Also, although several applications of providing incentives for media sharing and methods have been described, it should be recognized that numerous other applications are contemplated. Accordingly, other implementations are within the scope of the following claims.

What is claimed is:

1. A computer-implemented method comprising:
   receiving, by one or more computers, a plurality of media items;
   generating, by one or more computers, a plurality of segments of each media item from among the plurality of media items;
   classifying, by one or more computers, each segment from among the plurality of segments generated from the plurality of media items into one or more predetermined classes from among multiple predetermined classes of media items that could potentially violate content distribution guidelines;
   clustering, by one or more computers, to generate a cluster of segments for each of two or more predetermined classes, the cluster of segments including multiple segments from multiple different media items that have each been separately classified into a same predetermined class;
   presenting, by one or more computers, a cluster of segments, including multiple segments from the multiple media items that have each been separately classified into the same predetermined class, to a rating entity on a single user interface that is associated with the same predetermined class, for further evaluation;
   receiving, by one or more computers, a response from the rating entity indicating an approval of whether the cluster of segments, including the multiple segments from the multiple media items that were presented on the single user interface, does not violate the content distribution guidelines;
   identifying, by one or more computers and the response from the rating entity, the media items from among the plurality of media items for which all the segments were approved by the rating entity; and
   distributing, by one or more computers, the media items that were identified indicating that the media items does not violate the content distribution guidelines.

2. The method of claim 1, wherein presenting a cluster of segments to a rating entity and receiving a response from the rating entity further comprises: presenting, a cluster of segments to two or more rating entities for further evaluation; receiving, a response from each of the two or more rating entities indicating two or more approval of whether the cluster of segments does not violate content distribution guidelines; generating, a final approval by combining the responses from each of the two or more rating entities.

3. The method of claim 1, wherein classifying each segment from among the plurality of segments into two or more predetermined classes comprises using a machine learning algorithm to classify the segments into two or more pre-determined classes.

4. The method of claim 1, wherein receiving a response from the rating entity further comprises an approval of a subset of segments from the multiple segments in a cluster that indicates that the subset of segments does not violate content distribution policies.

5. The method of claim 1, wherein a rating entity can be a live rating entity or a computer implemented technique capable of evaluating segments generated from media items.

6. The method of claim 1, wherein the media item is a digital video.

7. The method of claim 1, wherein a cluster of segments that is presented to a rating entity includes one or more segments that have already been rated by another rating entity.

8. The method of claim 1, wherein one or more segments of a particular media item are not rated when an initial segment of the particular media item is determined to violate the content distribution guidelines.

9. A system comprising:
   receiving, by one or more computers, a plurality of media items;
   generating, by one or more computers, a plurality of segments of each media item from among the plurality of media items;
   classifying, by one or more computers, each segment from among the plurality of segments generated from the plurality of media items into one or more predetermined classes from among multiple predetermined classes of media items that could potentially violate content distribution guidelines;
   clustering, by one or more computers, to generate a cluster of segments for each of two or more predetermined classes, the cluster of segments including multiple segments from multiple different media items that have each been separately classified into a same predetermined class;

presenting, by one or more computers, a cluster of segments, including multiple segments from the multiple media items that have each been separately classified into the same predetermined class, to a rating entity on a single user interface that is associated with the same predetermined class, for further evaluation;

receiving, by one or more computers, a response from the rating entity indicating an approval of whether the cluster of segments, including the multiple segments from the multiple media items that were presented on the single user interface, does not violate the content distribution guidelines;

identifying, by one or more computers and the response from the rating entity, the media items from among the plurality of media items for which all the segments were approved by the rating entity; and distributing, by one or more computers, the media items that were identified indicating that the media items does not violate the content distribution guidelines.

10. The system of claim 9, wherein presenting a cluster of segments to a rating entity and receiving a response from the rating entity further comprises:

presenting, a cluster of segments to two or more rating entities for further evaluation;

receiving, a response from each of the two or more rating entities indicating two or more approval of whether the cluster of segments does not violate content distribution guidelines; and generating, a final approval by combining the responses from each of the two or more rating entities.

11. The system of claim 9, wherein classifying each segment from among the plurality of segments into two or more predetermined classes comprises using a machine learning model that comprises a plurality of trainable parameters that are trained to process the features of the segment to classify the segments into two or more pre-determined classes.

12. The system of claim 9, wherein receiving a response from the rating entity further comprises an approval of a subset of segments from the multiple segments in a cluster that indicates that the subset of segments does not violate content distribution policies.

13. The system of claim 9, wherein a rating entity can be a live rating entity or a computer implemented technique capable of evaluating segments generated from media items.

14. The system of claim 9, wherein the media item is a digital video.

15. The system of claim 9, wherein a cluster of segments that is presented to a rating entity includes one or more segments that have already been rated by another rating entity.

16. The system of claim 9, wherein one or more segments of a particular media item are not rated when an initial segment of the particular media item is determined to violate the content distribution guidelines.

17. A non-transitory computer readable medium storing instructions that, when executed by one or more data processing apparatus, cause the one or more data processing apparatus to perform operations comprising:

receiving, by one or more computers, a plurality of media items;

generating, by one or more computers, a plurality of segments of each media item from among the plurality of media items;

classifying, by one or more computers, each segment from among the plurality of segments generated from the plurality of media items into one or more predetermined classes from among multiple predetermined classes of media items that could potentially violate content distribution guidelines;

clustering, by one or more computers, to generate a cluster of segments for each of two or more predetermined classes, the cluster of segments including multiple segments from multiple different media items that have each been separately classified into a same predetermined class;

presenting, by one or more computers, a cluster of segments, including multiple segments from the multiple media items that have each been separately classified into the same predetermined class, to a rating entity on a single user interface that is associated with the same predetermined class, for further evaluation;

receiving, by one or more computers, a response from the rating entity indicating an approval of whether the cluster of segments, including the multiple segments from the multiple media items that were presented on the single user interface, does not violate the content distribution guidelines;

identifying, by one or more computers and the response from the rating entity, the media items from among the plurality of media items for which all the segments were approved by the rating entity; and distributing, by one or more computers, the media items that were identified indicating that the media items does not violate the content distribution guidelines.

18. A non-transitory computer readable medium of claim 17, wherein presenting a cluster of segments to a rating entity and receiving a response from the rating entity further comprises:

presenting, a cluster of segments to two or more rating entities for further evaluation;

receiving, a response from each of the two or more rating entities indicating two or more approval of whether the cluster of segments does not violate content distribution guidelines;

generating, a final approval by combining the responses from each of the two or more rating entities.

19. A non-transitory computer readable medium of claim 17, wherein classifying each segment from among the plurality of segments into two or more predetermined classes comprises using a machine learning model that comprises a plurality of trainable parameters that are trained to process the features of the segment to classify the segments into two or more pre-determined classes.

20. A non-transitory computer readable medium of claim 17, wherein receiving a response from the rating entity further comprises an approval of a subset of segments from the multiple segments in a cluster that indicates that the subset of segments does not violate content distribution policies.

* * * * *